July 15, 1958

R. C. McKEE 2,843,085

POLE BARNS

Filed Nov. 2, 1956

INVENTOR
RUSSELL. C. McKEE
BY
Frederick C. Bromley
ATTORNEY

July 15, 1958 R. C. McKEE 2,843,085
POLE BARNS
Filed Nov. 2, 1956 3 Sheets-Sheet 2
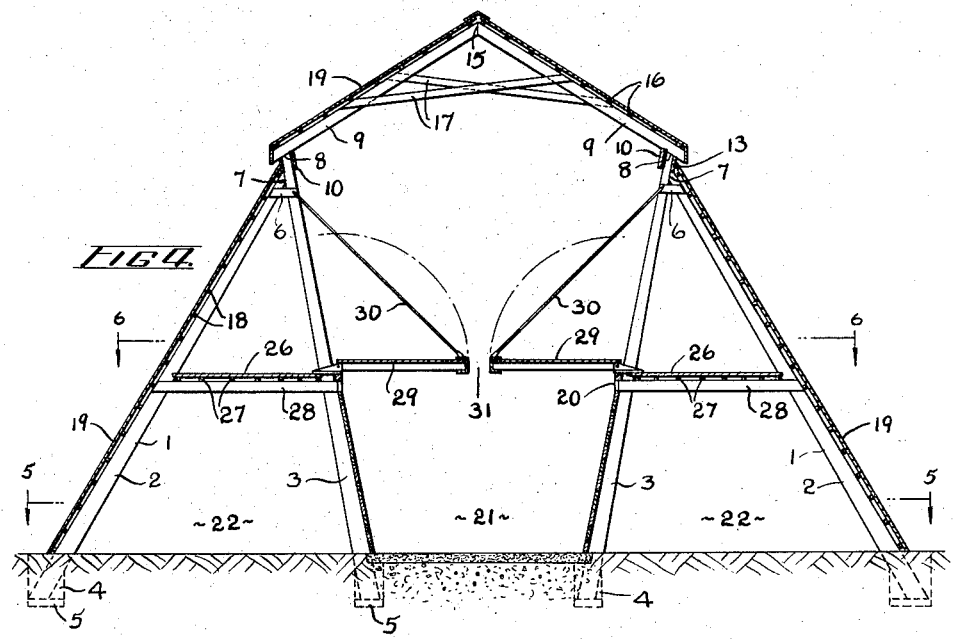
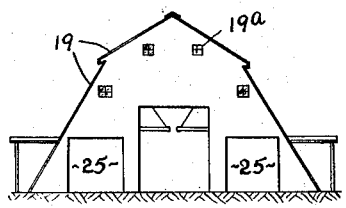
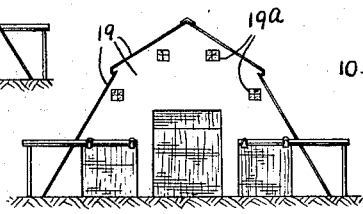
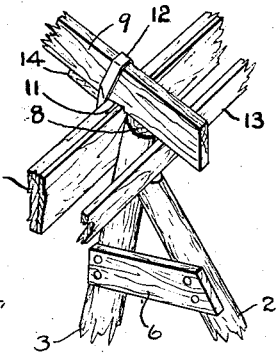
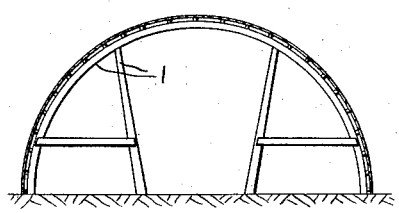
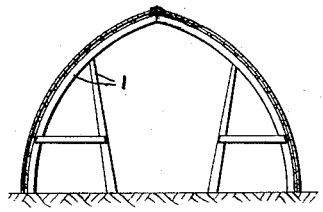
INVENTOR
RUSSELL. C. McKEE
BY
ATTORNEY July 15, 1958 R. C. McKEE 2,843,085
POLE BARNS
Filed Nov. 2, 1956 3 Sheets-Sheet 3
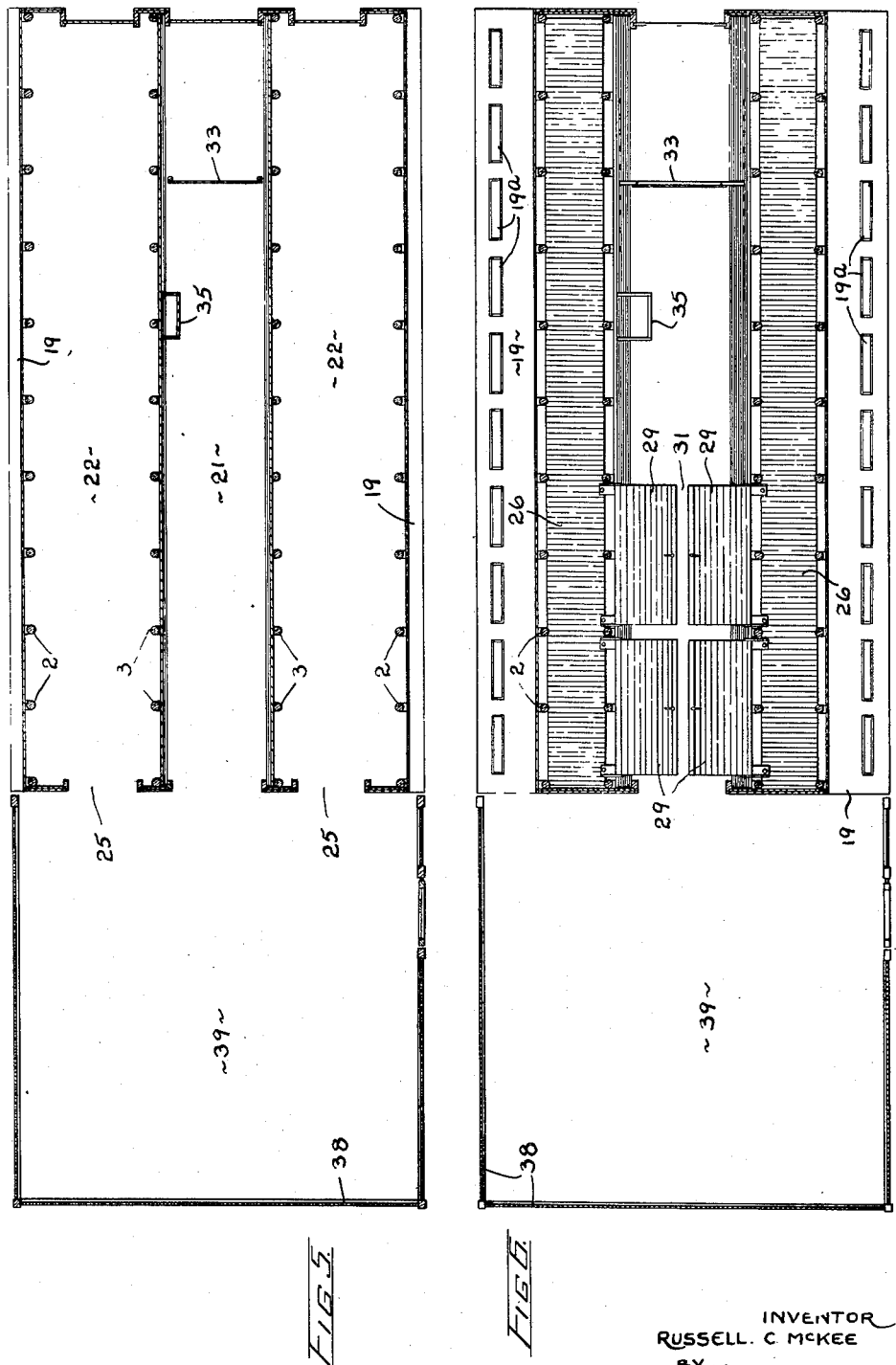
INVENTOR
RUSSELL. C. McKEE
BY
Frederick C. Bromley
ATTORNEY.

United States Patent Office 2,843,085
Patented July 15, 1958

2,843,085

POLE BARNS

Russell C. McKee, Elmira, Ontario, Canada, assignor to McKee Bros. Limited, Elmira, Ontario, Canada, a corporation of Ontario, Canada Application November 2, 1956, Serial No. 620,128

4 Claims. (Cl. 119—16)

The present invention relates to a barn for use in the feeding and sheltering of domestic animals. It has for its primary object to provide a simple and inexpensive barn structure capable of sheltering under all general weather conditions and of a capacity for holding feeding and bedding materials required for a large herd of cattle, such as one hundred.

A further object is to shorten the labour time involved in current methods of feeding, sheltering and keeping clean large numbers of cattle herded on a battery principle.

A still further object is to provide a design of building capable of withstanding high winds, snow and other inclemencies of weather and which will admit daylight without incorporating expensive window construction.

These objects are accomplished as will be apparent from the following description read in conjunction with the accompanying explanatory drawings, which illustrate a preferred form of construction of the invention.

Fig. 2 is a view of the front end of the barn in reduced scale;

Fig. 3 is a view in reduced scale of the rear end of the barn with closed doors;

Fig. 4 is an enlarged vertical section taken on line 4—4 of Fig. 1;

Fig. 5 is a horizontal section on the dotted line 5—5 of Fig. 4;

Fig. 6 is a section on line 6—6 of Figure 4;

Fig. 7 is a fragmentary perspective view at the purlin showing the top juncture of two poles which come together and are joined to the roof rafters and beams; and Figs. 8 and 9 show two modified types of frames, one of a Quonset type and the other of a Gothic type of frame.

Figure 1:
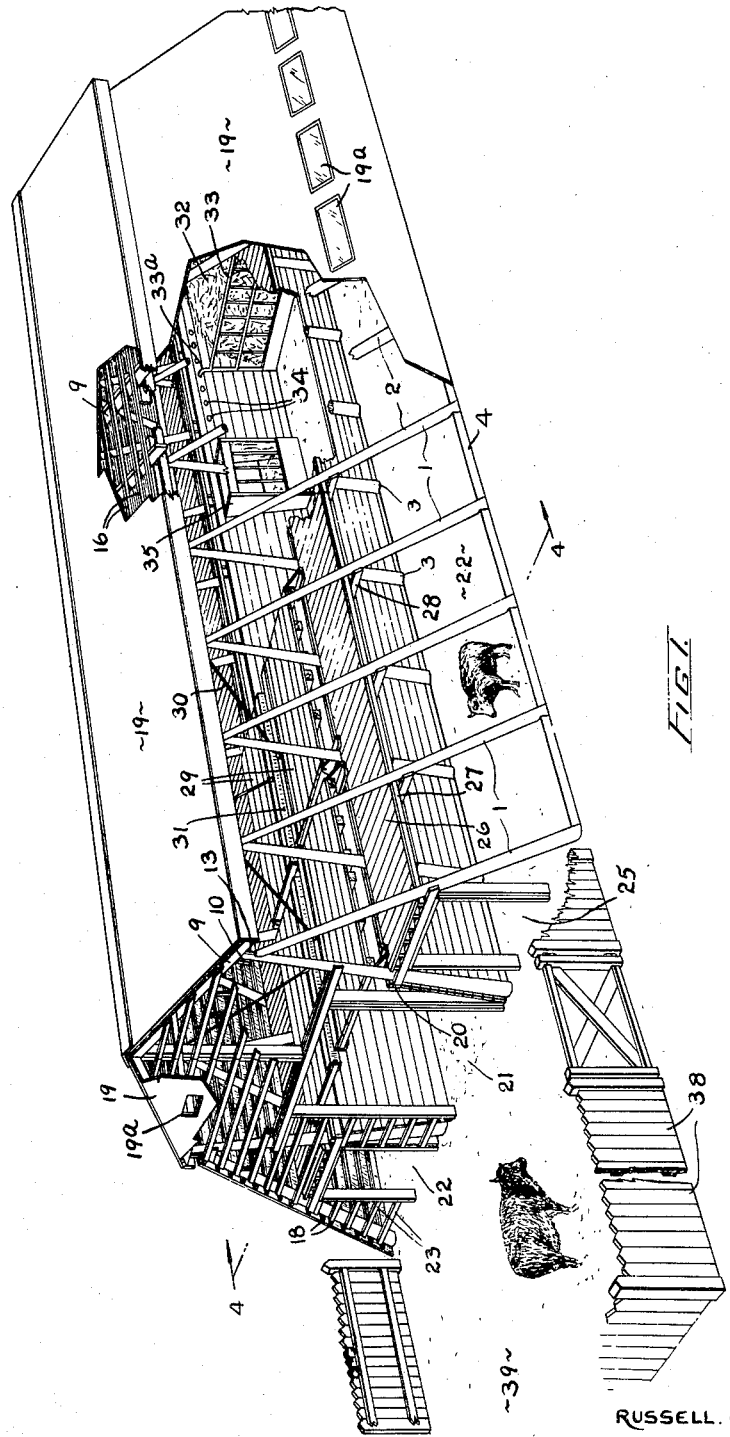
Fig. 1 is a general perspective view of the pole barn broken away in parts to shown the interior structure.

Referring to Figs. 1 to 7, the main framework of the barn consists of A-shaped frames made of poles 1, one leg 2 of each frame being longer than the other 3. Two A-frames 1 are placed in alignment perpendicularly to the ground, with the shorter leg 3 of each A-frame on the inside and directed towards the other 2 and a certain distance apart. The legs of the A-frames are sunk in trenches 4 having concrete foundations 5 and the trenches are continued at right angles to the plane of the said frames, according to the desired length of the barn. Similarly placed at suitable intervals along the trenches are further A-frames 1, so that the resulting rigid structure is a double row of A-frames in matching pairs.

At the apex of each A-frame is a clamping cross-piece 6. The longer leg 2 of the A-frame is abutted to the shorter leg 3, which continues for a short distance beyond the point of abutment 7 and forms a support 8 for roof rafters 9. An inner purlin 10 joins the inwardly facing sides of the legs 3 together at their tops and fits into a notch 11 in the said roof rafter 9. The rafter 9 is fixed to this purlin 10 by suitable means such as a strap iron 12 and this purlin is fixed as by nailing or otherwise to the tops of the legs 3. An outer purlin 13 joins the outwardly facing side of the legs 3 of the A-frames above the point of abutment 7 of the poles, the top of the leg 2 being faced to receive the underside of the said purlin 13.

A seal 14 is affixed to the underside of the rafters above the point of notching 11 to receive the inner purlin 10, the seal 14 abutting against the purlin and assisting in preventing the rafters 9 sliding down the top of the inner leg 3.

The rafters 9 from the tops of a pair of A-frames are inclined upwards as in the case of a normal roof and abut at the apex 15 of the roof. Roofing girts 16 are fixed to the rafters and extend longitudinally the length of the roof. Abutting rafters are strengthened by diagonally crossing rafter braces 17.

The framework for the sides of the barn is formed by girts 18 fixed to the outer legs 2 of the A-frames and extending longitudinally the length of the side of the barn. The roof and sides of the barn are covered with a suitable durable weatherproof material 19, such as corrugated iron sheets which are fixed to the roof and side girts. Windows 19a are let into the sides at suitable intervals and preferably consist of corrugated, transparent plastic sheets of a material such as "perspex," thereby obviating the need for window frames and glass panes, the plastic sheets having the same sectional curvatures so as to be readily interchangeable in uniform openings and to fit snugly.

The interior of the barn is divided by joining the inner legs 3 of the A-frames on their inner faces from ground level to a suitable height 20 by planking and other material thereby to form a centre area 21 and two side areas 22 running the length of the barn. The one end of the barn, the front end, is formed by horizontal girts 23 fixed to the end A-frames 1 and rafters 9 and a large doorway of substantial and practical dimension is provided for access to the centre area 21 and relatively smaller doors 25 communicating with the side areas.

The other end of the barn, the rear end, is arranged to face prevailing weather and is similarly girted and like doorways are provided the doorways having sliding doors. The said ends of the barn are covered by weatherproof material 19 as used for the roof and sides to the aforesaid horizontal girts, windows 19a being provided as desired. The barn may be said to have a hip roof, the sides not being vertical, as is usual, but simulating outwardly inclined skirts hanging from the ends of the roof.

The side areas 22 are covered by laying flooring 26 on joists 27 laid horizontally upon the lower clamping cross pieces 28 of each A-frame, the flooring continuing over the side areas for the length of the barn. These continuous floorings form overlays and are used for the purpose of storing animal foodstuffs such as hay and straw. Further overhead storage space is obtained by providing hinged overlays 29 consisting of a series of strongly constructed flaps hinged side by side to the inner edges of the overlays at the front end of the barn and stretching towards the rear thereof. The hinged overlays 29 are maintained in a horizontal position by supporting their inner edges with wire cables 30 anchored near to the apices of the respective A-frames. With the hinged overlays 29 horizontal, an almost continuous flooring is provided at the front end of the barn above the centre and side areas, the exception being that a longitudinal gap 31 is left between the inner edges of the hinged overlays 29 to allow straw blower pipes (not shown) to be passed upwards from the centre area when straw bunkering is in progress. The gap can be closed under normal conditions by strong rigid sheeting laid down across it. The hinged overlays 29 can be raised to a position perpendicular to their original horizontal placing by turning them angularly upwards about their hinges, thereby stowing unobtrusively so that tall machinery which may be required to operate in the centre area can be admitted.

Silage 32, usually in the form of newly cut grass, is piled at the rear end of the centre area (see Fig. 1). A gate 33 pins the silage at the rear end of the centre area, the gate 33 being fashioned of steel bar fabrication or like material which will allow animals in the front centre area to feed from the silage "face" behind the gate.

The side uprights of the gate are extended upwardly and curve outwardly at 33a so that their ends can engage in longitudinally spaced U-shaped slots 34 provided along the centre area wall at the rear end; thus the gate 33 may be moved forwardly or rearwardly of the centre area, so that the gate can always be maintained at the silage face as animals consume silage or as silage is added.

A portable dry hay feeder 35 is placed in the centre area and can be refilled from the overlays 26, 29.

With this construction of barn, animals are provided with loafing areas in the side areas 22 and a feeding and loafing area in the centre areas. There is no feeding in the side areas and animals come to the central area for food from either the silage gate or the dry hay feeder.

The most laborious work involved in looking after a herd of animals using the barn is attending to the storing at the rear end of the barn with silage and the overlays with hay and straw. Daily, very little time need be spent by one man moving the silage gate as silage is consumed, replenishing the dry hay feedbox and cleaning out the loafing areas, which may be earth or concreted by mechanical means. The floors are spread with straw that can be tipped down suitable chutes (not shown) from the overlays. The front end of the exterior of the barn is fenced at 38 to form an exercise yard 39 for the animals.

As will be observed with reference to Figs. 8 to 9, the A-frames 1 may be of Quonset design as in Fig. 8 or of Gothic design in Fig. 9.

It will be appreciated from the above description that this simply-constructed barn provides a labour saving method of herding animals on a large scale and ensures their comfort and correct feeding. It will further be appreciated that the invention is not to be regarded as being limited to the construction described and illustrated by way of example, since various modifications may be made without departing from the spirit and scope of the invention as defined in the appended claims.

The embodiments of the invention in which an exclusive property or privilege is claimed are defined as follows:

1. In an elongated barn structure, two parallel rows of longitudinally spaced A-frames, the A-frames in said rows being anchored at their lower ends in a support surface and being disposed in co-planar pairs, each A-frame comprising upwardly extending angularly disposed converging inner and outer legs secured together at their upper ends and a horizontal cross piece extending between intermediate portions thereof, longitudinal purlins secured at the converging upper ends of said legs, a roof supported on the upper ends of said A-frames, an outer covering material secured on the outer legs and extending the length of said parallel rows of A-frames from the support surface to said roof defining the exterior side walls of the barn structure, transverse end walls secured at opposite ends of said rows of A-frames, a horizontal floor supported on said horizontal cross pieces and extending the length of said rows of A-frames between the inner and outer legs, and an interior covering material secured on said inner legs and extending the length of said rows of A-frames from the lower portion of said inner legs to the horizontal floor, a lower portion of said outer covering material, horizontal floor and interior covering material defining longitudinal uninterrupted parallel loafing portions extending the length of the rows of A-frames, the roof and interior covering material defining a longitudinal central combined feeding-and-loafing portion extending the length of said rows of A-frames, an upper portion of the outer covering material and said horizontal floor defining an overlying storage space extending the length of the barn and communicating with said central combined feeding-and-loafing portion, at least one of said end walls including doorways therethrough communicating with said parallel loafing portions and the combined loafing-and-feeding portions to provide access by livestock thereto.

2. The structure of claim 1 including a supplemental floor extending from opposed inner edges of said horizontal floor, said supplemental floor comprising at least a pair of panels, one of each of said pair of panels being pivotally connected for upward movement at the opposed inner edges of the horizontal floor, said panels terminating in spaced relation at their inner edges, and means normally supporting said panels in parallel horizontal relation above said central combined feeding-and-loafing area for defining a storage space thereabove communicating with the storage spaces above said longitudinal parallel loafing portions, said means permitting said panels to be raised from said horizontal position.

3. The structure of claim 1 including a longitudinally adjustable and vertically extending barrier disposed transversely of the central combined feeding-and-loafing portion for defining a variable sized food supply area with the adjacent end wall, said adjacent end wall including a doorway permitting access to said food supply area for replenishing the supply therein.

4. The structure of claim 3 including a supplemental floor extending from opposed inner edges of said horizontal floor, said supplemental floor comprising at least a pair of panels, one of each of said pair of panels being pivotally connected for upward movement at the opposed inner edges of the horizontal floor, said panels terminating in spaced relation at their inner edges, and means normally supporting said panels in parallel horizontal relation above said central combined feeding-and-loafing area for defining a storage space thereabove communicating with the storage spaces above said longitudinal parallel loafing portions, said means permitting said panels to be raised from said horizontal position.

References Cited in the file of this patent

UNITED STATES PATENTS

| | | |
|---|---|---|
| 440,369 | Saucerman | Nov. 11, 1890 |
| 1,353,956 | Hervieu et al. | Sept. 28, 1920 |
| 2,520,555 | Major | Aug. 29, 1950 |
| 2,626,591 | Mazur et al. | Jan. 27, 1953 |